United States Patent
Lahr et al.

(10) Patent No.: US 12,046,952 B2
(45) Date of Patent: Jul. 23, 2024

(54) DISCONNECTED ROTOR WEB FOR INCREASED RELUCTANCE

(71) Applicant: GM GLOBAL TECHNOLOGY OPERATIONS LLC, Detroit, MI (US)

(72) Inventors: Derek Frei Lahr, Howell, MI (US); Anthony Michael Coppola, Rochester Hills, MI (US); Alireza Fatemi, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 189 days.

(21) Appl. No.: 17/725,653

(22) Filed: Apr. 21, 2022

(65) Prior Publication Data
US 2023/0344287 A1    Oct. 26, 2023

(51) Int. Cl.
H02K 1/27    (2022.01)

(52) U.S. Cl.
CPC ........................ H02K 1/27 (2013.01)

(58) Field of Classification Search
CPC ....... H02K 1/276; H02K 1/278; H02K 1/2706
See application file for complete search history.

(56) References Cited

U.S. PATENT DOCUMENTS

| | | | |
|---|---|---|---|
| 10,666,099 B1 * | 5/2020 | Fatemi | H02K 1/278 |
| 11,133,724 B2 | 9/2021 | Lahr et al. | |
| 2010/0277017 A1 * | 11/2010 | Alexander | H02K 1/2773 29/598 |
| 2013/0026872 A1 * | 1/2013 | Cirani | H02K 1/2766 310/156.08 |
| 2019/0027983 A1 * | 1/2019 | Michaelides | H02K 1/2773 |
| 2020/0395801 A1 * | 12/2020 | Leonardi | H02K 1/276 |
| 2021/0040608 A1 * | 2/2021 | Coppola | C23C 16/511 |
| 2021/0044168 A1 * | 2/2021 | Coppola | H02K 1/276 |

OTHER PUBLICATIONS

U.S. Appl. No. 17/181,193, filed Feb. 22, 2021, Lahr et al.

* cited by examiner

*Primary Examiner* — Tran N Nguyen
*Assistant Examiner* — Masoud Vaziri (57) ABSTRACT

A rotor of an electric machine includes: N pole pieces, each of the N pole pieces including two half pole pieces, where N is an integer greater than 2; apertures through the half pole pieces, respectively; permanent magnets disposed within the apertures, respectively, the permanent magnets including, in each of the N pole pieces, a first permanent magnet of a first magnetic polarity and a second permanent magnet of a second magnetic polarity; and structural non-magnetic portions disposed in gaps of the half pole pieces, respectively, and configured to magnetically disconnect a rotor web from a q-axis flux guide.

17 Claims, 11 Drawing Sheets

DISCONNECTED ROTOR WEB FOR INCREASED RELUCTANCE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric motors such as for vehicles and more particularly to rotors of electric motors.

Some types of vehicles include only an internal combustion engine that generates propulsion torque. Hybrid vehicles include both an internal combustion engine and one or more electric motors. Some types of hybrid vehicles utilize the electric motor and the internal combustion engine to improve fuel efficiency. Other types of hybrid vehicles utilize the electric motor and the internal combustion engine to achieve greater torque output.

Examples of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine. The present application is applicable to electric vehicles, hybrid vehicles, and other types of vehicles.

An electric machine functions as a motor by utilizing electrical energy to produce mechanical torque through the interaction of rotor magnetic fields and stator fields produced by electric current-carrying conductors. Some electric motors may also function as generators by using torque to produce electrical energy. An electric machine such as an interior permanent magnet machine or a synchronous machine has a rotor assembly that includes a rotor core with magnets of alternating polarity spaced around the rotor core. Some rotor cores define slots that act as barrier layers for magnetic fields. Some of the slots may contain the magnets.

Stress levels in a rotor core due to centrifugal force are often highest at a web or at a bridge of the rotor core. Increasing the thickness of the web or bridge or increasing the arc radius of the slot that partially defines the web or bridge may reduce such stress, but not without a torque reduction due to increased flux leakage.

SUMMARY

In a feature, a rotor of an electric machine includes: N pole pieces, each of the N pole pieces including two half pole pieces, where N is an integer greater than 2; apertures through the half pole pieces, respectively; permanent magnets disposed within the apertures, respectively, the permanent magnets including, in each of the N pole pieces, a first permanent magnet of a first magnetic polarity and a second permanent magnet of a second magnetic polarity; and structural non-magnetic portions disposed in gaps of the half pole pieces, respectively, and configured to magnetically disconnect a rotor web from a q-axis flux guide.

In further features, the structural non-magnetic portions are one of adhered, bonded, and brazed to inner surfaces of the gaps of the half pole pieces, respectively.

In further features, the N pole pieces include K stacked layers made of a magnetic material, where K is an integer greater than 2.

In further features, the q-axis flux guide is mechanically connected to a rotor root configured to engage an output shaft.

In further features, a width of the gaps is at least 2 times greater than an air gap between an outer circumference of the rotor and an inner circumference of a stator that surrounds the rotor.

In further features, non-magnetic inserts are disposed in the gaps, respectively, between the structural non-magnetic portions and inner surfaces of the gaps.

In further features, the rotor web is mechanically connected to a rotor root configured to engage an output shaft.

In further features, the structural non-magnetic portions are disposed between the rotor web and a rotor root configured to engage an output shaft.

In further features, the structural non-magnetic portions include L-shaped non-magnetic portions and horizontally flipped L-shaped non-magnetic portions.

In further features, the structural non-magnetic portions include S-shaped non-magnetic portions and horizontally flipped S-shaped non-magnetic portions.

In further features, inner edges of the gaps include mechanical keying features and the structural non-magnetic portions extend into the mechanical keying features.

In further features, the mechanical keying features have a fir tree arrangement.

In further features, the structural non-magnetic portions includes a polymer.

In further features, the polymer includes a thermosetting resin.

In further features, the polymer includes at least one of an epoxy, bismaleimide, polyurethane, acrylic, phenolic, benzoxazine, and polyimide.

In further features, the polymer includes filler particles.

In further features, the filler particles include at least one of glass fiber particles and ceramic particles.

In further features, inner edges of the gaps are cleaned using a degreaser prior to the disposition of the structural non-magnetic portions within the gaps.

In further features, the inner edges of the gaps are etched prior to the disposition of the structural non-magnetic portions within the gaps.

In further features, the inner edges of the gaps are primed with a primer prior to the disposition of the structural non-magnetic portions within the gaps.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An electric motor includes a stator and a rotor. Magnetic flux generated by the stator drives rotation of the rotor via magnets in the rotor. Maximum rotor speed and magnetic performance may be limited by stress in rotor webs and bridges of the rotor. As maximum speed increases, the rotor webs may be increased and involve more magnet mass.

The present application involves rotor laminates that include non-magnetic material that magnetically isolates portions of the laminates that may otherwise magnetically short circuit the magnets of a dual layer magnet design such that the magnetic flux of the rotor does not cross the air gap and interact with the stator. Load is managed across the pieces of laminate, which both present centrifugal loads during rotation.

Rotors are designed in consideration of both structural characteristics and magnetic characteristics. Rotor webs and bridges may be designed to maximize structure as to allow maximum rotor speed. However, this may decrease magnetic performance as magnetic flux may not cross the air gap between the outer diameter of the rotor and interact with the stator. The present application describes implementations that increase structural characteristics while maintaining performance and, therefore allowing the maximum rotor speed. Stated differently, the increased magnetic performance can be achieved while maintaining structural characteristics. Leakage flux may refer to flux generated by the magnets of the rotor that does not cross the air gap between the rotor and the stator and instead remains on the rotor and returns to the magnets.

Figure 1:
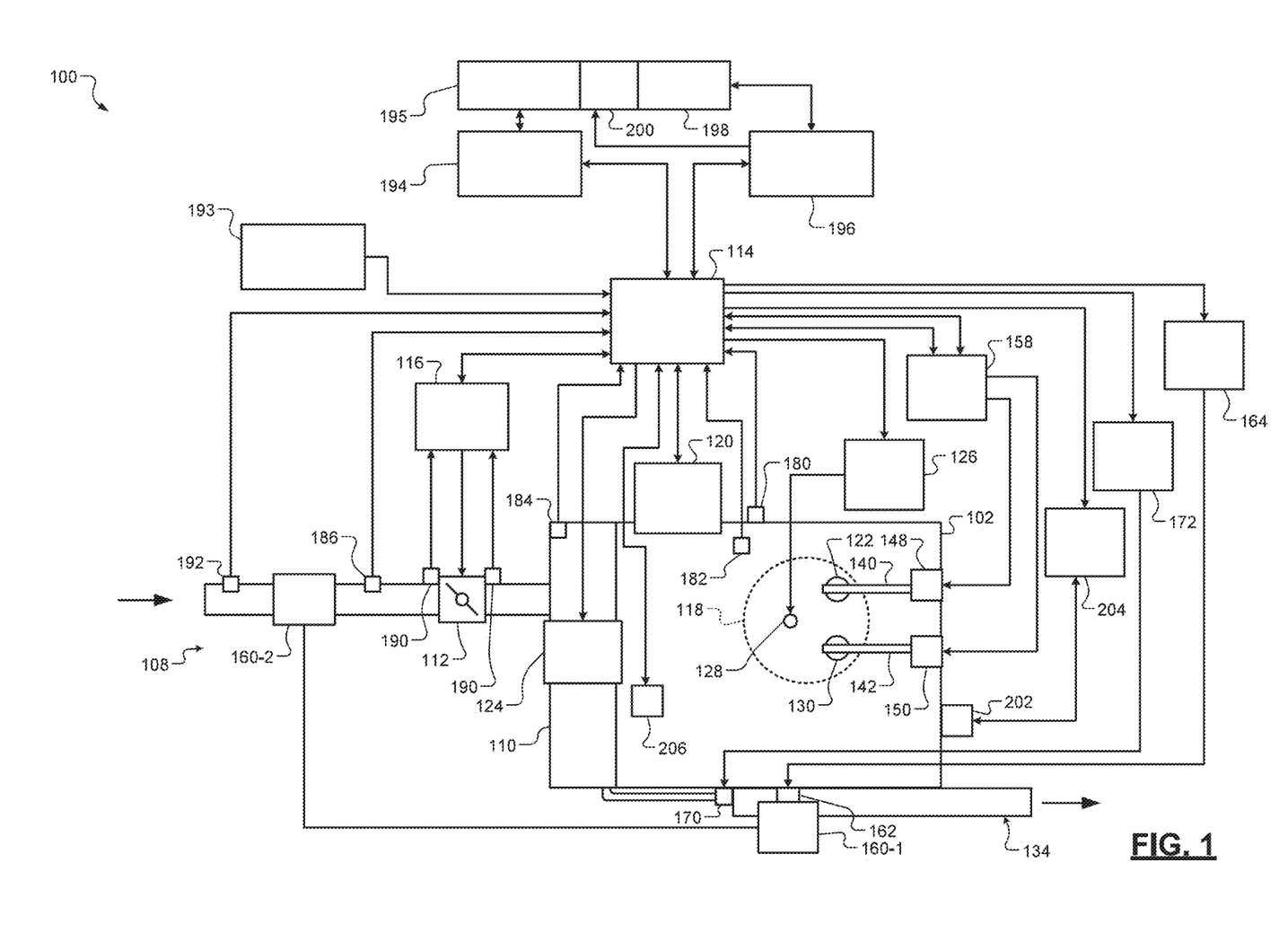
FIG. 1 is a functional block diagram of an example engine control system.

Referring now to FIG. 1, a functional block diagram of an example powertrain system 100 is presented. The powertrain system 100 of a vehicle may include an engine 102 that combusts an air/fuel mixture to produce torque. The vehicle may be non-autonomous or autonomous. While an example hybrid vehicle including both the engine 102 and an electric motor is described, the present application is also applicable to pure electric vehicles that do not include an engine and include more than one electric motor. The present application is also applicable to other types of vehicles and electric motors (and electric machines) not used in vehicles.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft-based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate (WG) 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198 (electric machine). While the example of one electric motor is provided, multiple electric motors may be implemented. The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a battery to the electric motor 198 to cause the electric motor 198 to output positive torque. The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195. In various implementations, the electric motor 198 may be omitted. The present application is also applicable to the inclusion of multiple electric motors.

Figure 2:
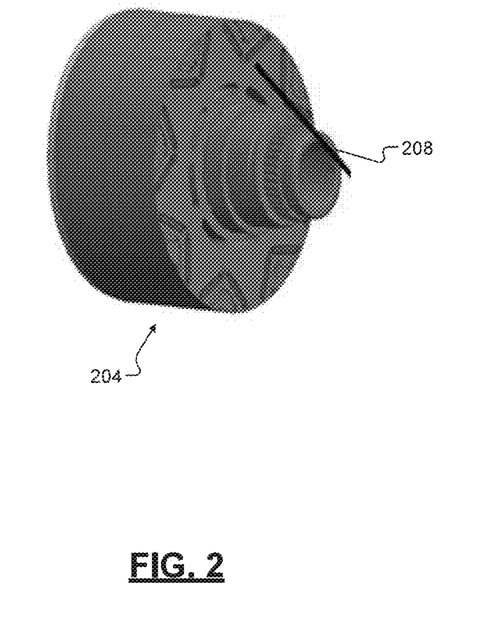
FIG. 2 is a perspective view of an example implementation of a rotor and an output shaft of an electric motor.

FIG. 2 is a perspective view of an example portion of the electric motor 198. The electric motor 198 includes a rotor 204 and a stator (not shown) that surrounds the rotor 204. The electric motor 198 is a radial flux electric motor. The rotor includes a plurality of permanent magnets that extend through stacked laminates.

When current flows through the stator, the stator generates magnetic flux that drives rotation of the rotor 204. The rotor 204 is mechanically coupled to an output shaft 208. The output shaft 208 transfers torque to one or more wheels of the vehicle. As stated above, in various implementations, the vehicle may include multiple electric motors, such as one electric motor for the front axle and one electric motor for the rear axle, one electric motor per wheel, etc.

Figure 3:
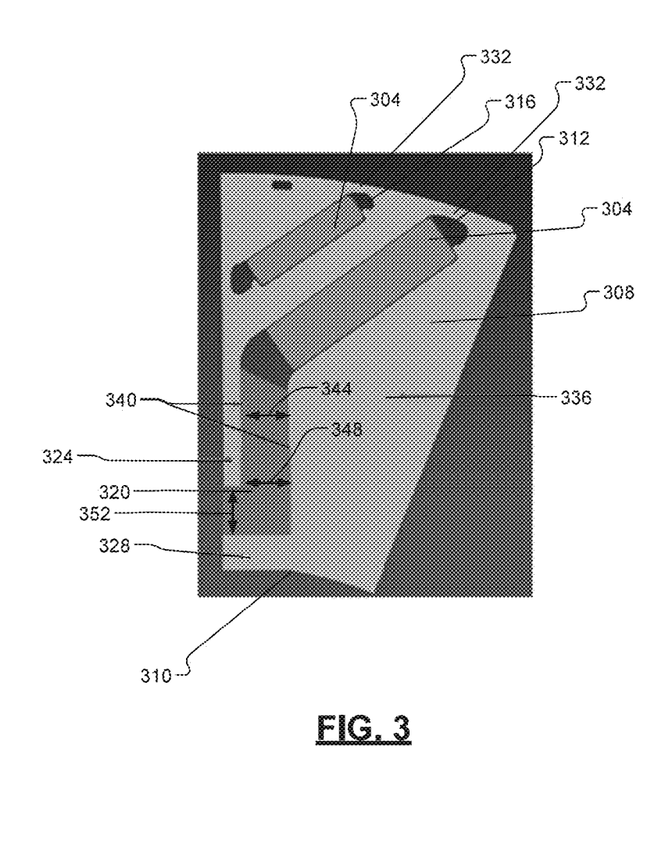
FIGS. 3-4 are front perspective views of example half pole pieces of a rotor.
Figure 4:
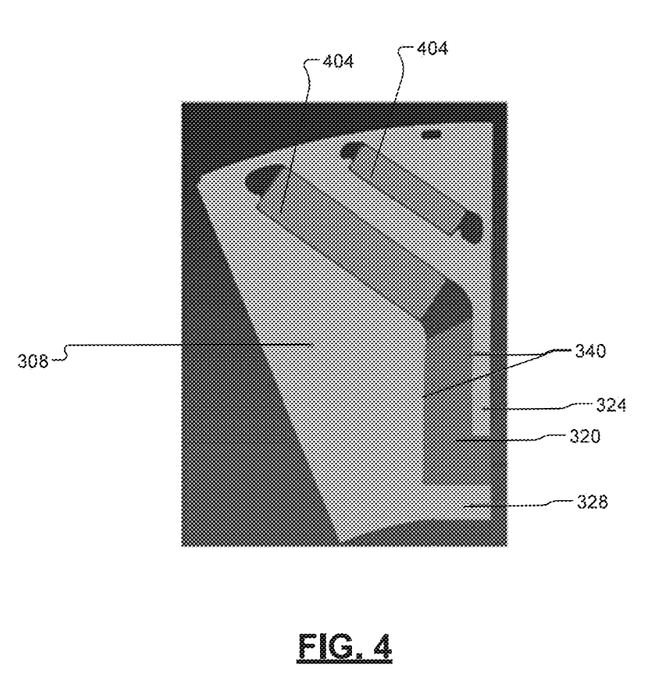
Figure 5:
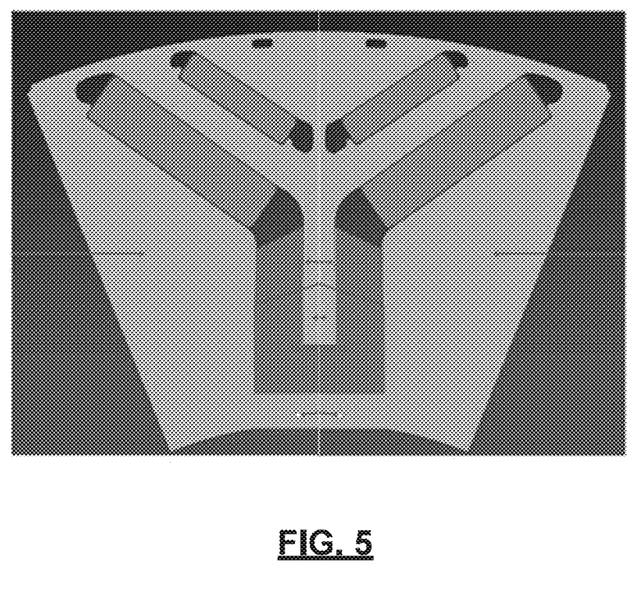
FIG. 5 is a front perspective view of an example pole piece of a rotor.

FIG. 3 is a perspective view of an example of a one half of one of N pole pieces of the rotor 204. N is 8 in the example of FIG. 2 (corresponding to 16 half pole pieces), although other numbers of pole pieces may be used. The example of FIG. 3 includes the right half of the one of the N pole pieces. The left half of the one of the pole pieces is horizontally flipped relative to FIG. 3, such as shown in FIG. 4 including the left half of one of the pole pieces. FIG. 5 includes an example illustration of 1 of the N pole pieces.

The left halves of the pole pieces includes permanent magnets 404 of a first polarity (e.g., negative), and the right halves of the pole pieces include permanent magnets 304 of the same polarity (e.g., positive) oriented radially outwardly. As illustrated, the magnets of each pole piece form a V shape. The magnets of adjacent pole pieces are of opposite polarity (e.g., positive, negative, positive, negative, etc.).

The rotor 204 includes a stack of K identical circular laminates 308 that include central apertures 310 for the output shaft 208. K is an integer greater than 1 and may be, for example, 20 or another suitable number. Only ⅟₁₆ of the circular laminate 308 is shown in FIGS. 3 and 4 for the example of N=8 (i.e., each of the 16 half pole pieces includes ⅟₁₆ of the circular laminate 308 for clarity. The laminates 308 are made of an electrically conductive and ferrous material, such as iron or an iron alloy. The magnet 304 in the aperture 312 is larger than the magnet 304 in the aperture 316.

The laminates 308 include apertures 312 and 316 for each half pole piece. Radially outermost portions of the apertures 312 and 316 of each half pole piece may be parallel. The radially outermost portions of the apertures 312 and 316 of a left half pole piece may be approximately perpendicular to the radially outermost portions of the apertures 312 and 316 of the right half pole piece. The radially outermost portions of the apertures 312 of the right half of a pole piece extend clockwise (leftward). The radially outermost portions of the apertures 312 of the left half of a pole piece extend counter clockwise (rightward).

The permanent magnets 304 are disposed within the radially outermost portions of the apertures 312 and 316 and extend through all of the K laminates 308. A radially inner portion of the aperture 312 of the right half pole piece of each of the N pole pieces extends radially inwardly and connects with a radially inner portion of the aperture 312 of the left half pole piece of that one of the N pole pieces, as shown in the example of FIG. 5.

A non-ferrous (non-magnetic) and non-electrically conductive (i.e., electrically insulative/isolative) material 320 is structural and is disposed within portions of the radially inner most portions of the apertures 312. The material 320 may be, for example, a polymer, aluminum, brass, ceramic, or another suitable type of non-magnetic material. The material 320 magnetically isolates a web 324 of the half pole piece from a rotor root 328. The radially inner most portion of the aperture 312 of the right half of a pole piece includes a portion that extends leftward. The radially inner most portion of the aperture 312 of the left half of a pole piece includes a portion that extends rightward. The radially inner most portion of the aperture 312 of the right half of a pole piece includes a portion that forms a horizontally flipped L shape. The radially inner most portion of the aperture 312 of the left half of a pole piece includes a portion that forms an L shape. The material 320 provides the structural characteristics as to allow for maximum rotor speed.

The rotor root 328 is coupled to the output shaft. The web extends radially outwardly and may be linear (e.g., as shown in FIGS. 3-5) or nonlinear, such as shown in later figures. Bridges 332 of each half pole piece are disposed radially outwardly of the apertures 312 and 316. Each half pole piece includes a q-axis flux guide 336 where q-axis flux may be more concentrated on the half pole piece.

The polymer may include a thermosetting resin, such as an epoxy, bismaleimide, polyurethane, acrylic, phenolic, benzoxazine, polyimide, or another suitable polymer. The polymer may or may not have filler particles, such as glass fiber minerals, or ceramics.

Outer edges of the material 320 may be bonded, adhered (via an adhesive), or mechanically keyed to inner edges of the radially inner portion of the aperture 316 as illustrated by 340. The inner edges of the aperture 316 may be cleaned, such as with a degreaser, and acid etched, such as to remove surface oxides prior to the insertion of the material 320 into the aperture 312. The inner edges of the aperture 312 may also be primed using a primer prior to the insertion of the material 320. The primer may include, for example, silanes or epoxies. The polymer (the material 320) may be inserted such as by pouring prior to curing the material 320 under external heating, by injection molding followed by curing, or in another suitable manner.

Figure 6:
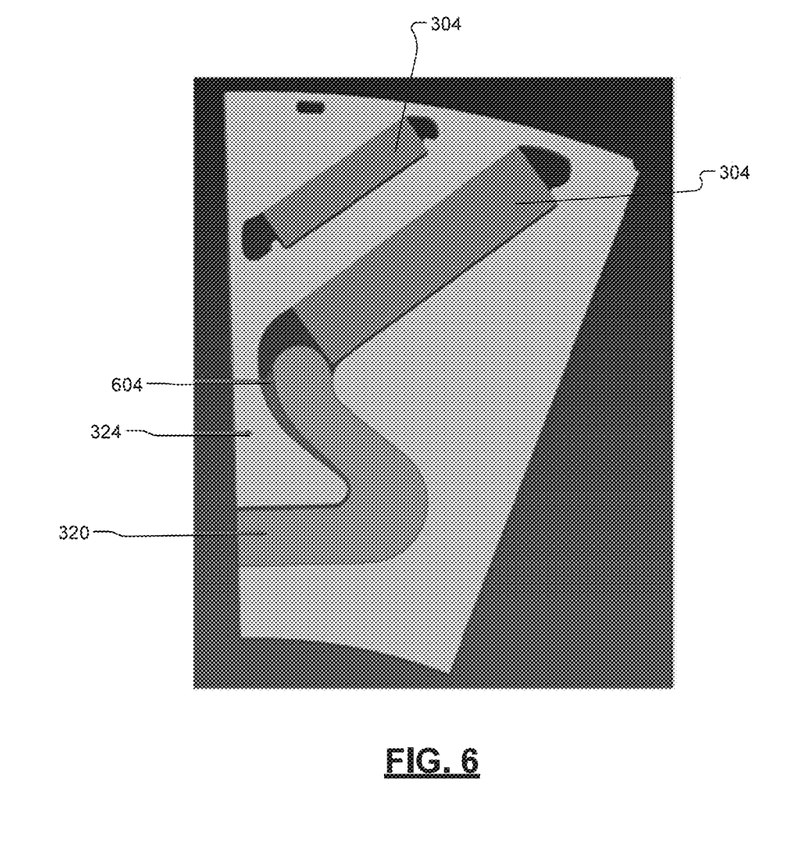
FIGS. 6-8 are front perspective views of example half pole pieces of a rotor.

As illustrated in the example of FIG. 6, the radially inner most portion of the aperture 312 of the right half of a pole piece includes a portion that extends leftward and a portion that extends rightward and forms an S shape. The radially inner most portion of the aperture 312 of the left half of a pole piece includes a portion that extends rightward and a portion that extends leftward and forms a horizontally flipped S shape. In this example, the web 324 has a dovetail shape. The dovetail shape may increase a structural load carrying capability of the web 324.

In various implementations, such as illustrated in FIG. 6, an additional filling material 604 may be included between an outer edge of the material 320 and the inner edge of the aperture 312. The additional filling material 604 may be, for example, for tolerancing, such as in the example of the material 320 being formed before being inserted into the aperture 312.

As shown in FIG. 3, gaps 344, 348, and 352 are formed between the inner edges of the aperture 312. The gaps 344, 348, and 352 may be the same distance or one or more of the gaps 344, 348, and 352 may have a different distance. For example, the gap 348 may be greater than the gap 344 such that the gap between inner edges of the aperture 312 increases moving radially outwardly. A smallest one of the gaps between the inner edges of the aperture 312 may be large enough to minimize leakage flux. For example, the smallest one of the gaps between the inner edges of the aperture 312 may be at least 2 times greater (larger) than an air gap between an outermost edge of the rotor 204 and an innermost edge of the stator. The material 320 secures the web 324 to the rest of the laminate 308 and creates a (non-magnetic) structural bridge. In various implementations, the material 320 may be brazed to the laminate 308.

Figure 7:
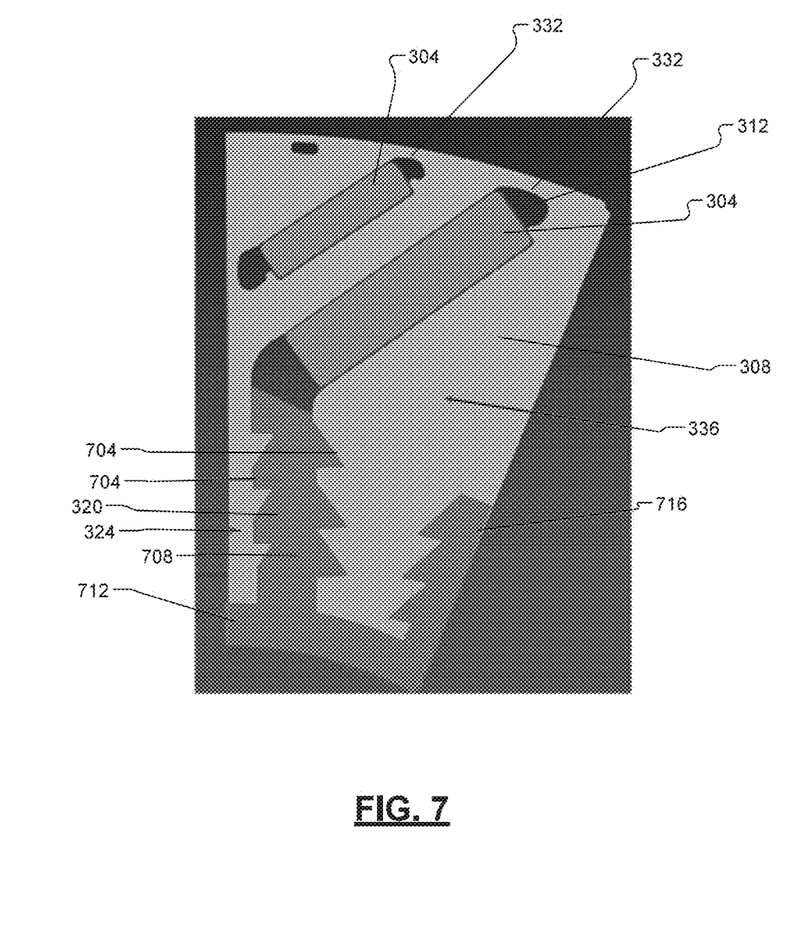

FIG. 7 includes a perspective view including an example implementation of mechanical keying between the material 320 and the inner edges of the aperture 312. As illustrated, the inner edges of the aperture 312 may include a fir tree arrangement. The fir tree arrangement may include a series of triangular and/or frustotriangular projections 704 into and/or away from a trunk 708. In the example of FIG. 6, a non-magnetic rotor ring 712 may be mechanically coupled to the output shaft 208. The rotor ring 712 may be the same material as the material 320 or a different non-magnetic material.

Each laminate may also include a second fir tree arrangement 716 of the material 320 that extends radially outwardly from the rotor ring 712. The second fir tree arrangement 716 may be completed with the adjacent half pole piece of the adjacent pole piece. For example, FIG. 7 illustrates half of the second fir tree arrangement 716 being on the right half of one pole piece. The other half of the second fir tree arrangement 716 is included on the left half of the pole piece that is to the right (clockwise) from the half pole piece shown in FIG. 7. In this example, the web 324, the q-axis flux guide 336, and the rotor root are not magnetically connected. The rotor root is omitted in this example and is provided by the rotor ring 712.

Figure 8:
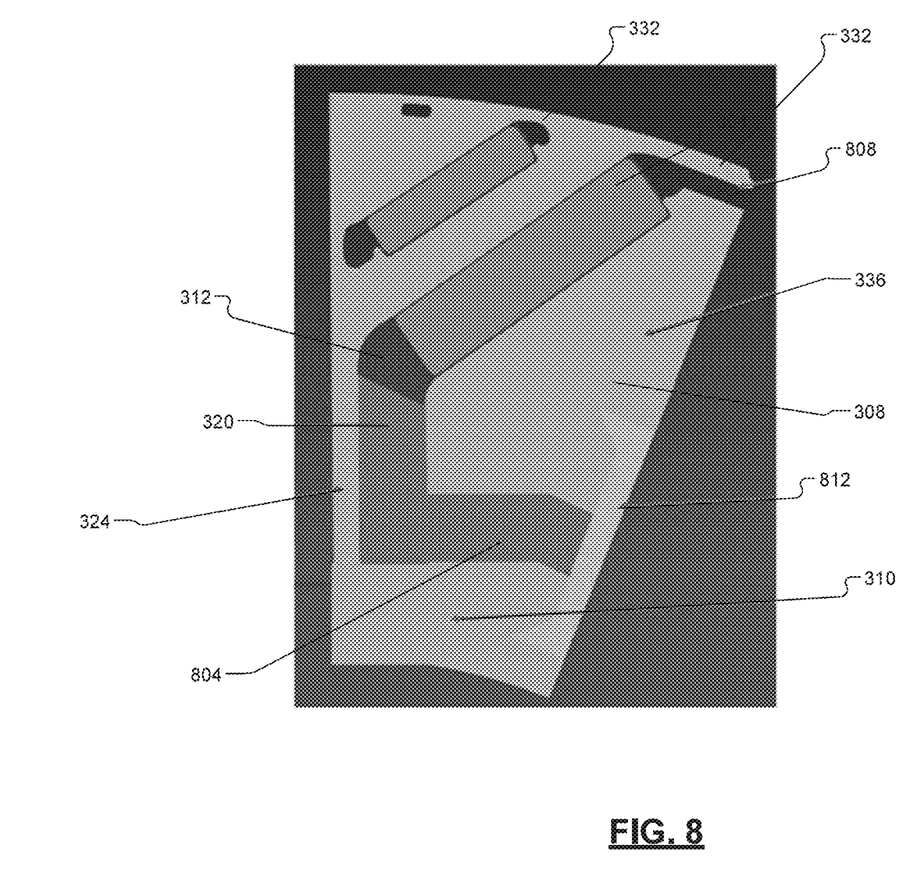

FIG. 8 is a perspective view of an example implementation of the half pole piece. In the example of FIG. 8, the aperture 312 (within which the larger magnet 304 is disposed) extends radially inwardly and includes a rightward (clockwise) extension 804. The material 320 is disposed within the radially inward extension and the rightward extension 804. In this example, the half pole piece of the next pole piece clockwise from the half pole piece includes a leftward extension that mirrors the rightward extension 804.

The aperture 312 also includes a radially extending portion that follows a radius 808 radially inward of the bridge 332. With the example arrangement of FIG. 8, the q-axis flux guide 336 would float or be disconnected from the bridge 332 and the rotor root 310. However, the laminate 308 includes an insert 812 that mechanically couples the q-axis flux guide 336 to the rotor root 310. The insert 812 may be I shaped or butterfly inlay shaped, such as shown, or have another suitable shape. The insert 812 holds the q-axis flux guide 336 to the rotor root 310.

The insert 812 is made of a non-magnetic material. The insert 812 may be made of the same material as the material 320 or a different (non-magnetic) material. In various implementations, the insert 812 may be omitted if the portion 808 of the aperture is omitted. If the portion 808 is omitted, the q-axis flux guide would be mechanically connected via the bridge 332.

Described above and shown is a permanent magnet synchronous rotor including magnets of pole pieces in V shaped arrangements. The web is magnetically disconnected from the q-axis flux guide by the non-magnetic material 320 disposed in the aperture 312. The q-axis flux guide is mechanically connected to the rotor root in some examples.

A gap (filled by the material) magnetically disconnects the web from the q-axis flux guide. The width of the gap limits flux leakage and is at least 2 times greater than the air gap between the stator and the rotor. In various implementations, the q-axis flux guide is mechanically coupled to the rotor root via a non-magnetic insert that bridges the gap. In various implementations, the web may be connected to the rotor root. In various implementations, neither the web nor the q-axis flux guide is connected to a rotor root. The non-magnetic material may further create a rotor ring that is connected to an output shaft. The output shaft and a radially inner portion of the rotor (either rotor root or rotor ring) may include features (e.g., teeth) that engage teeth on an outer portion of the output shaft.

Figure 9:
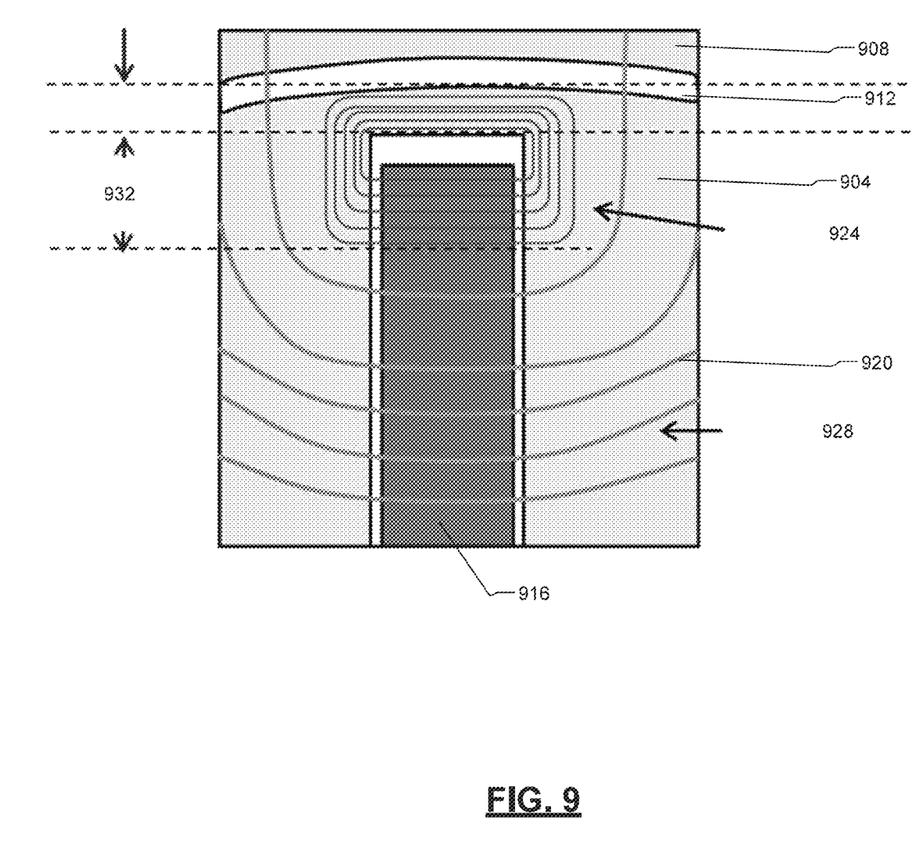
FIG. 9 is an example illustration regarding leakage flux.

FIG. 9 is a perspective view including an example rotor 904, a stator 908, and an air gap 912 between the rotor 904 and the stator. 916 is a permanent magnet of the rotor 904. Flux lines are illustrated, such as by 920.

924 illustrates bridge leakage flux where the flux lines do not cross the air gap 912 and instead return to the magnet 916. 928 illustrates torque producing flux lines that cross the air gap 912. 932 illustrates a short circuited portion where the flux of the magnet 916 returns to the magnet 916 without crossing the air gap 912.

Figure 10:
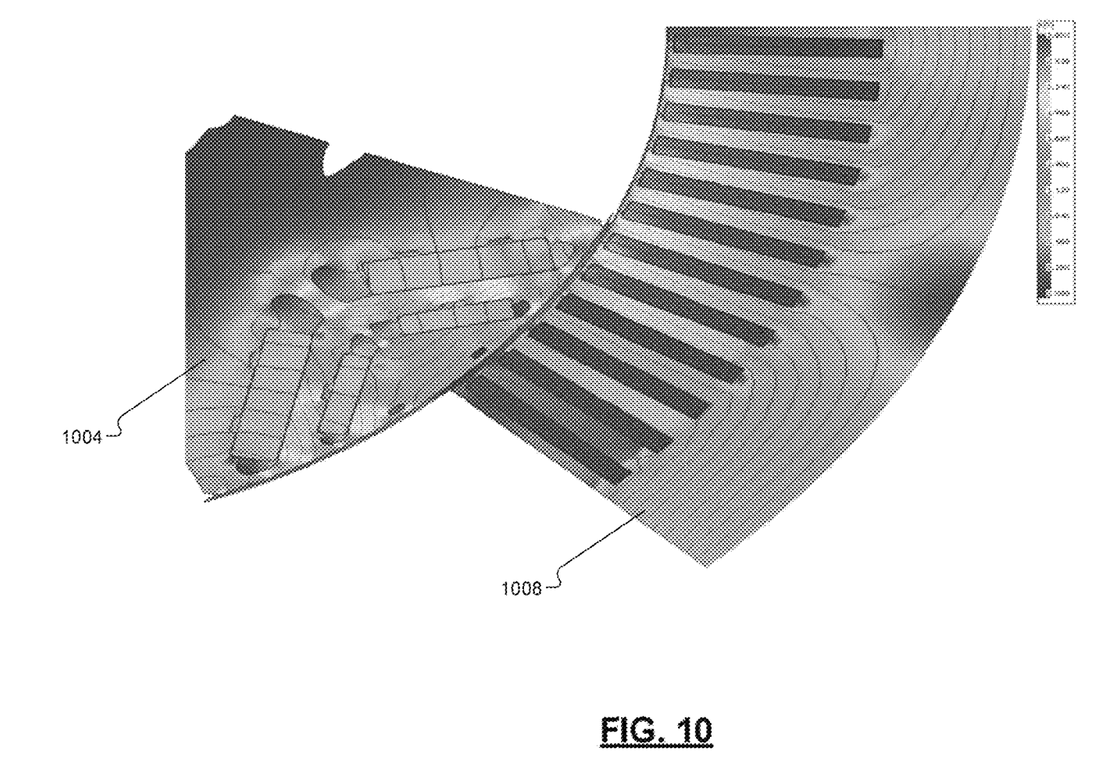
FIGS. 10 and 11 includes an example illustration of flux lines for example implementations with and without non-magnetic portions as described herein.
Figure 11:
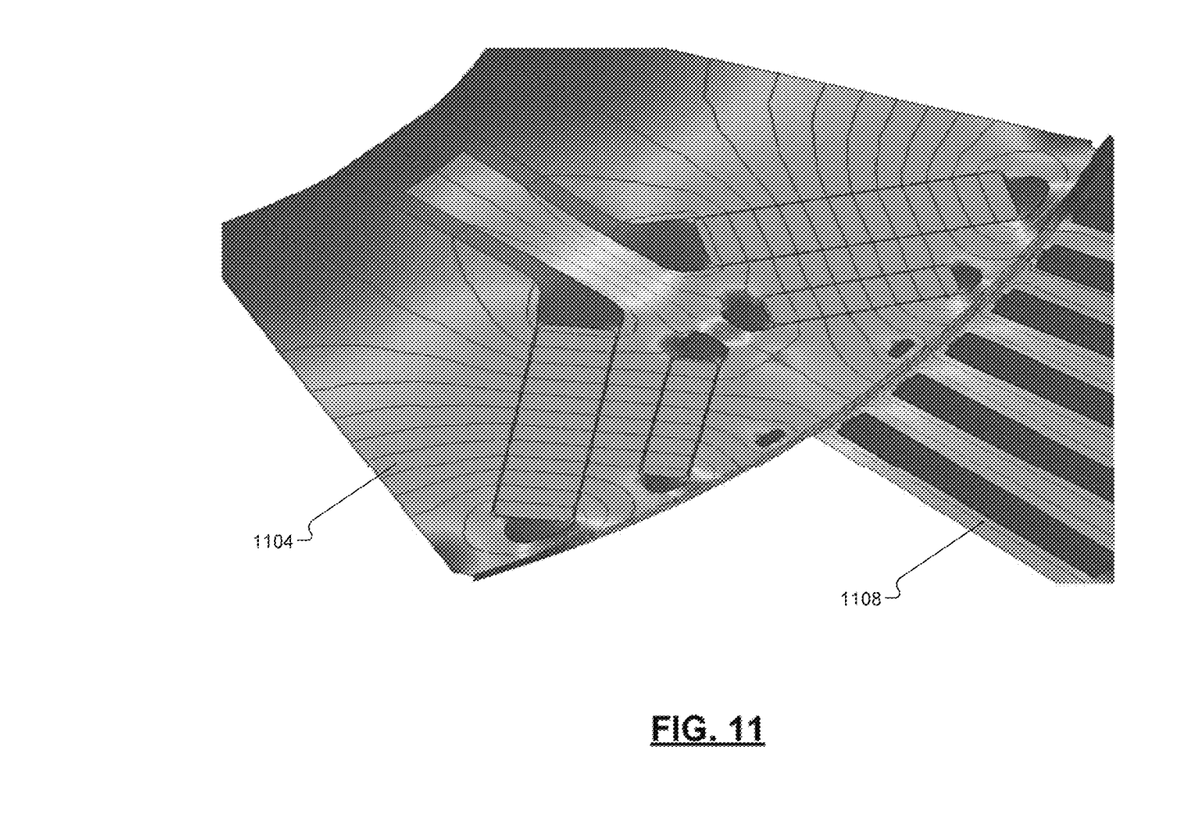

FIG. 10 is a perspective view including an example rotor 1004 and a stator 1008 where the rotor 1004 does not include the non-magnetic material as described herein. FIG. 11 is a perspective view including an example rotor 1104 and a stator 1108 where the rotor 1104 does include the non-magnetic material as described herein. Flux lines are illustrated in FIGS. 10 and 11. Comparing FIGS. 10 and 11 reveals that a similar amount of magnet may be shorted, but the web is larger in the example of FIG. 11 for higher strength.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A rotor of an electric machine, the rotor comprising:
   N pole pieces, each of the N pole pieces including two half pole pieces,
   wherein N is an integer greater than 2;
   apertures through the half pole pieces, respectively;
   permanent magnets disposed within the apertures, respectively, the permanent magnets including, in each of the N pole pieces, a first permanent magnet of a first magnetic polarity and a second permanent magnet of a second magnetic polarity; and
   structural non-magnetic portions disposed in gaps of the half pole pieces, respectively, and configured to magnetically disconnect a rotor web from a q-axis flux guide,
   inner edges of the gaps include mechanical keying features and the structural non-magnetic portions extend into the mechanical keying features, and wherein the mechanical keying features have a fir tree arrangement.

2. The rotor of claim 1 wherein the structural non-magnetic portions are one of adhered, bonded, and brazed to inner surfaces of the gaps of the half pole pieces, respectively.

3. The rotor of claim 1 wherein the N pole pieces include K stacked layers made of a magnetic material, where K is an integer greater than 2.

4. The rotor of claim 1 wherein the q-axis flux guide is mechanically connected to a rotor root configured to engage an output shaft.

5. The rotor of claim 1 wherein a width of the gaps is at least 2 times greater than an air gap between an outer circumference of the rotor and an inner circumference of a stator that surrounds the rotor.

6. The rotor of claim 1 further comprising non-magnetic inserts disposed in the gaps, respectively, between the structural non-magnetic portions and inner surfaces of the gaps.

7. The rotor of claim 1 wherein the rotor web is mechanically connected to a rotor root configured to engage an output shaft.

8. The rotor of claim 1 wherein the structural non-magnetic portions are disposed between the rotor web and a rotor root configured to engage an output shaft.

9. The rotor of claim 1 wherein the structural non-magnetic portions include L-shaped non-magnetic portions and horizontally flipped L-shaped non-magnetic portions.

10. The rotor of claim 1 wherein the structural non-magnetic portions include S-shaped non-magnetic portions and horizontally flipped S-shaped non-magnetic portions.

11. The rotor of claim 1 wherein the structural non-magnetic portions includes a polymer.

12. The rotor of claim 11 wherein the polymer includes a thermosetting resin.

13. The rotor of claim 11 wherein the polymer includes at least one of an epoxy, bismaleimide, polyurethane, acrylic, phenolic, benzoxazine, and polyimide.

14. The rotor of claim 11 wherein the polymer includes filler particles.

15. The rotor of claim 14 wherein the filler particles include at least one of glass fiber particles and ceramic particles.

16. The rotor of claim 1 wherein the inner edges of the gaps are etched prior to the disposition of the structural non-magnetic portions within the gaps.

17. The rotor of claim 16 wherein the inner edges of the gaps include a primer prior to the disposition of the structural non-magnetic portions within the gaps.

* * * * *